(12) United States Patent
He et al.

(10) Patent No.: US 11,913,986 B2
(45) Date of Patent: Feb. 27, 2024

(54) RELIABILITY EVALUATION METHOD AND SYSTEM OF MICROGRID INVERTER IGBT BASED ON SEGMENTED LSTM

(71) Applicant: WUHAN UNIVERSITY, Hubei (CN)

(72) Inventors: Yigang He, Hubei (CN); Chuankun Wang, Hubei (CN); Chenyuan Wang, Hubei (CN); Lie Li, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 264 days.

(21) Appl. No.: 17/496,787

(22) Filed: Oct. 8, 2021

(65) Prior Publication Data

US 2022/0120807 A1 Apr. 21, 2022

(30) Foreign Application Priority Data

Oct. 19, 2020 (CN) .......................... 202011116964.4

(51) Int. Cl.
| | |
|---|---|
| *G01R 31/26* | (2020.01) |
| *H02M 7/537* | (2006.01) |
| *G06F 30/367* | (2020.01) |
| *G06F 119/04* | (2020.01) |
| *G06F 119/02* | (2020.01) |

(52) U.S. Cl.
CPC ..... *G01R 31/2608* (2013.01); *G01R 31/2642* (2013.01); *G06F 30/367* (2020.01); *H02M 7/537* (2013.01); *G06F 2119/02* (2020.01); *G06F 2119/04* (2020.01)

(58) Field of Classification Search
CPC ............ G01R 31/2608; G01R 31/2642; G06F 30/367; G06F 2119/02; G06F 2119/04; G06F 30/27; G06F 2119/08; H02M 7/537; H02M 7/5387; G06N 3/044; G06N 3/045; G06N 3/08
See application file for complete search history.

(56) References Cited

U.S. PATENT DOCUMENTS

| | | | | |
|---|---|---|---|---|
| 2022/0074985 | A1* | 3/2022 | He | ......................... G06F 30/20 |
| 2022/0076777 | A1* | 3/2022 | Luo | ........................ G11C 29/54 |

* cited by examiner

*Primary Examiner* — Christopher P McAndrew
*Assistant Examiner* — Zannatul Ferdous
(74) *Attorney, Agent, or Firm* — JCIPRNET

(57) ABSTRACT

A reliability evaluation method and system for a microgrid inverter IGBT based on segmented long short-term memory (LSTM) is disclosed, including steps as follows. An electrothermal coupling model is constructed to obtain real-time junction temperature data. The original LSTM algorithm is improved to obtain a segmented LSTM prediction network for the aging characteristics of the IGBT. The monitoring value of the IGBT aging parameter is used to perform segmented LSTM prediction to obtain the predicted aging process, and the threshold values of different aging stages are categorized. An aging correction is performed on the aging parameter of the electrothermal coupling model to ensure the accuracy of the junction temperature data. Rainflow-counting algorithm is used to calculate real-time thermal stress load distribution of the IGBT. The fatigue damage theory and the Lesit life prediction model are combined to calculate the real-time cumulative damage and predicted life of the IGBT.

9 Claims, 8 Drawing Sheets

RELIABILITY EVALUATION METHOD AND SYSTEM OF MICROGRID INVERTER IGBT BASED ON SEGMENTED LSTM

CROSS-REFERENCE TO RELATED APPLICATION

This application claims the priority benefit of China application serial no. 202011116964.4, filed on Oct. 19, 2020. The entirety of the above-mentioned patent application is hereby incorporated by reference herein and made a part of this specification.

BACKGROUND

Technology Field

The disclosure belongs to the reliability field of core devices of power electronic equipment, and more specifically, to a reliability evaluation method and system for a microgrid inverter IGBT based on segmented long short-term memory (LSTM).

Description of Related Art

Microgrids can take full advantage of the high efficiency and flexibility of distributed power sources. Meanwhile, the balance of load power is maintained by the scheduling management function of the microgrids, and an optimal management to a certain degree can be achieved. Due to a diversity of distributed power sources and the complexity of operating modes, the reliability of an microgrid inverter is particularly important in practical applications; With advantages, such as fast switching speed, simple driving circuit, good voltage resistance, and large current capacity, insulated gate bipolar transistors (IGBTs) have been widely applied to microgrid inverters. While the inverter in the microgrid plays a key role in the conversion, the transmission, and the storage of electric energy, under complex and changeable working conditions, the core device IGBT often bears a large number of power cycles and thermal cycle loads, so the performance gradually degrades, which in turn leads to a failure. To a large extent, the failure of the inverter results from the failure of the IGBT. To ensure the microgrid to operate in a reliable and stable manner, it is necessary to study the online reliability evaluation of the IGBT applied in the microgrid.

Junction temperature fluctuation is the main cause of the failure of the IGBT. Different thermal expansion coefficients of the internal materials of the IGBT result in uneven thermal stress on the internal structure of the IGBT, often causing damage to the bonding portion of materials, such as bond wires, solder layers, and the internal of a chip. There are two methods for online acquisition of junction temperature: direct measurement and indirect measurement. The direct measurement obtains junction temperature data by embedding an integrated sensor inside an IGBT module, but the electromagnetic compatibility of the integrated sensor needs to be considered in the design and production of the IGBT. Moreover, this method has the problems of data transmission delay and increased cost in actual projects. The indirect measurement estimates the junction temperature of the IGBT in real time by constructing an electrothermal coupling model and has advantages, such as low delay and strong online monitoring capabilities. However, the electrothermal coupling model of the IGBT is generally constructed based on the factory technical manual of the IGBT. With constant aging of the IGBT due to fatigue damage during the working process, the pre-constructed electrothermal coupling model can no longer adapt to the current IGBT state, leading to the inaccurate results of a reliability analysis.

The aging of the IGBT has a non-negligible impact on reliability evaluation, so monitoring the aging of the IGBT can provide new ideas for the correction of electrothermal coupling parameters. Common aging parameters of the IGBT include gate turn-on threshold voltage, module thermal resistance, collector current, collector-emitter voltage, and the like. To evaluate the IGBT state more comprehensively, the data-driven method can extract more health information from the historical data of the state parameters. Data-driven is a method that uses traditional numerical methods, statistical theories, machine learning, and other means to predict the time series of observation parameters and then predicts the health status of IGBTs. At present, there are few studies on predicting and analyzing the aging process of IGBTs using machine learning algorithms.

SUMMARY

Regarding the defects or improvement requirements of the prior art, the disclosure proposes a fusion reliability evaluation method and system for a microgrid inverter IGBT based on segmented long short-term memory (LSTM). With the method and the system, the IGBT reliability analysis is combined with the aging monitoring, and the machine learning algorithm is introduced into IGBT aging prediction; the aging process of devices is accurately predicted based on the limited aging observation parameters, which serves as the basis for real-time updates of the electrothermal coupling model parameters, improves the calculation efficiency of reliability evaluation, and has strong online monitoring capabilities.

To achieve the objective, according to one aspect of the disclosure, a fusion reliability evaluation method for a microgrid inverter IGBT based on segmented long short-term memory (LSTM) is provided. The method includes:

(1) constructing an electrothermal coupling model for a microgrid inverter topology and an IGBT type;

(2) introducing a machine learning algorithm into an IGBT aging prediction and obtaining a segmented LSTM prediction network for aging characteristics of the IGBT;

(3) using monitoring values of IGBT aging parameters to perform a segmented LSTM prediction, obtaining a predicted aging process, and performing an aging correction on parameters of the electrothermal coupling model to ensure accuracy of junction temperature data, wherein, the aging parameter includes an IGBT collector-emitter turn-off impulse voltage;

(4) using a rainflow-counting algorithm to process junction temperature data output by the electrothermal coupling model corrected based on segmented LSTM prediction results and calculating real-time thermal stress load distribution of the IGBT; and (5) combining a fatigue damage theory and a Lesit life prediction model and calculating real-time cumulative damage and predicted life of the IGBT.

In some alternative implementations, a training method of the segmented LSTM prediction network includes:
retaining top several part data of the predicted aging data when performing a first LSTM prediction, wherein the top several part data together with the initial aging training data constitute a training data set for a second LSTM prediction;

retaining the top several part data of the predicted aging data when performing the second LSTM prediction, wherein the top several part data together with previous aging training data constitute a training data set for a third LSTM prediction; and retaining all predicted aging data in the third LSTM prediction.

In some alternative implementations, step (3) includes:

(3.1) using the monitoring values of the IGBT aging parameters to perform the segmented LSTM prediction to obtain the predicted aging process;

(3.2) categorizing thresholds of different aging stages according to an aging process curve;

(3.3) comparing a threshold value with monitored aging data, determining an aging stage of the IGBT in real time, and then selecting a corresponding aging correction coefficient; and (3.4) updating thermal network parameters of the electrothermal coupling model by the aging correction coefficient to ensure the accuracy of the junction temperature data.

In some alternative implementations, step (3.4) includes: updating the thermal network parameters of the electrothermal coupling model with $R=R_{initial}(1+a \cdot r^m)$. $R_{initial}$ is the thermal network parameter of the electrothermal coupling model, a is an aging factor, r is the aging correction coefficient, m is a thermal stress factor, and R is a thermal resistance value.

According to another aspect of the disclosure, a fusion reliability evaluation system for a microgrid inverter IGBT based on segmented long short-term memory (LSTM) is provided. The system includes:

a model constructing unit, configured to construct an electrothermal coupling model for a microgrid inverter topology and an IGBT type;

a prediction network constructing unit, configured to introduce a machine learning algorithm into an IGBT aging prediction and obtain a segmented LSTM prediction network for aging characteristics of the IGBT;

a prediction correction unit, configured to perform a segmented LSTM prediction by using monitoring values of IGBT aging parameters, obtain a predicted aging process, and perform an aging correction on parameters of the electrothermal coupling model to ensure accuracy of junction temperature data, wherein the aging parameters include the IGBT collector-emitter turn-off impulse voltage;

a junction temperature data processing unit, configured to process junction temperature data output by the electrothermal coupling model corrected based on a segmented LSTM prediction result by using a rainflow-counting algorithm and calculate real-time thermal stress load distribution of the IGBT; and a reliability evaluation unit, configured to combine a fatigue damage theory and a Lesit life prediction model to calculate real-time cumulative damage and predicted life of the IGBT.

In some alternative implementations, a training method of the segmented LSTM prediction network includes:

retaining top several part data of the predicted aging data when performing a first LSTM prediction, wherein the top several part data together with the initial aging training data constitute a training data set for a second LSTM prediction;

retaining the top several part data of the predicted aging data when performing the second LSTM prediction, wherein the top several part data together with previous aging training data constitute a training data set for a third LSTM prediction; and retaining all predicted aging data in the third LSTM prediction.

In some alternative implementations, the prediction correction unit is configured to: use the monitoring values of the IGBT aging parameters to perform the segmented LSTM prediction to obtain the predicted aging process; categorize thresholds of different aging stages according to an aging process curve; compare a threshold value with monitored aging data, determine an aging stage of the IGBT in real time, and then select a corresponding aging correction coefficient; and update thermal network parameters of the electrothermal coupling model by the aging correction coefficient to ensure the accuracy of the junction temperature data.

In some alternative implementations, the thermal network parameters of the electrothermal coupling model are updated by $R=R_{initial}(1+a \cdot r^m)$. $R_{initial}$ is the thermal network parameter of the electrothermal coupling model, a is an aging factor, r is the aging correction coefficient, m is a thermal stress factor, and R is a thermal resistance value.

According to another aspect of the disclosure, a computer-readable storage medium including a computer program stored thereon is provided. The computer program implements steps of any one of claims 1 to 4 when the computer program is executed by a processor.

Generally speaking, compared with the prior art, the technical solutions conceived by the disclosure can achieve beneficial effects as follows.

1. A machine learning algorithm is introduced into IGBT aging prediction, and online monitoring capabilities is strengthened. The segmented LSTM solves the contradiction between the long IGBT aging cycle and the limited monitoring data time series and reduces the dependence on the length of the monitoring data time series.

2. The IGBT reliability analysis and condition monitoring are fused, and the accuracy of evaluation improves. Based on limited aging monitoring data, the aging process of the device can be accurately predicted and the aging stage can be determined in real time. According to the aging stage of the IGBT, the parameters of the electrothermal coupling model are updated to eliminate the influence of the aging process on the reliability analysis.

DESCRIPTION OF THE EMBODIMENTS

In order to make the objectives, technical solutions, and advantages of the disclosure comprehensible, embodiments accompanied with drawings are described in detail below to further describes the disclosure. It should be understood that the specific embodiments described herein are merely used to explain the disclosure, but not intended to limit the disclosure. In addition, the technical features involved in the various embodiments of the disclosure described below can be combined with each other as long as they do not conflict with each other.

In the subsequent paragraphs, a 20 kW double-fed wind power generation system in a microgrid is illustrated as a specific embodiment, and the specific parameters are shown in Table 1. Using the fusion reliability evaluation method for a microgrid inverter IGBT based on segmented long short-term memory (LSTM) to analyze the reliability of the grid-side inverter IGBT, and further illustrate the disclosure in detail accompanied with drawings.

TABLE 1

Wind Power System Parameters

| category | parameter |
| --- | --- |
| rated power/kW | 20 |
| cut-in wind speed/(m/s) | 3 |
| rated wind speed/(m/s) | 11 |
| cut out wind speed/(m/s) | 25 |
| grid side voltage/V | 690 |
| network side frequency/Hz | 50 |
| IGBT switching frequency/kHz | 10 |
| DC side voltage/V | 1100 |
| IGBT type | IRG4BC30K |

Figure 1:
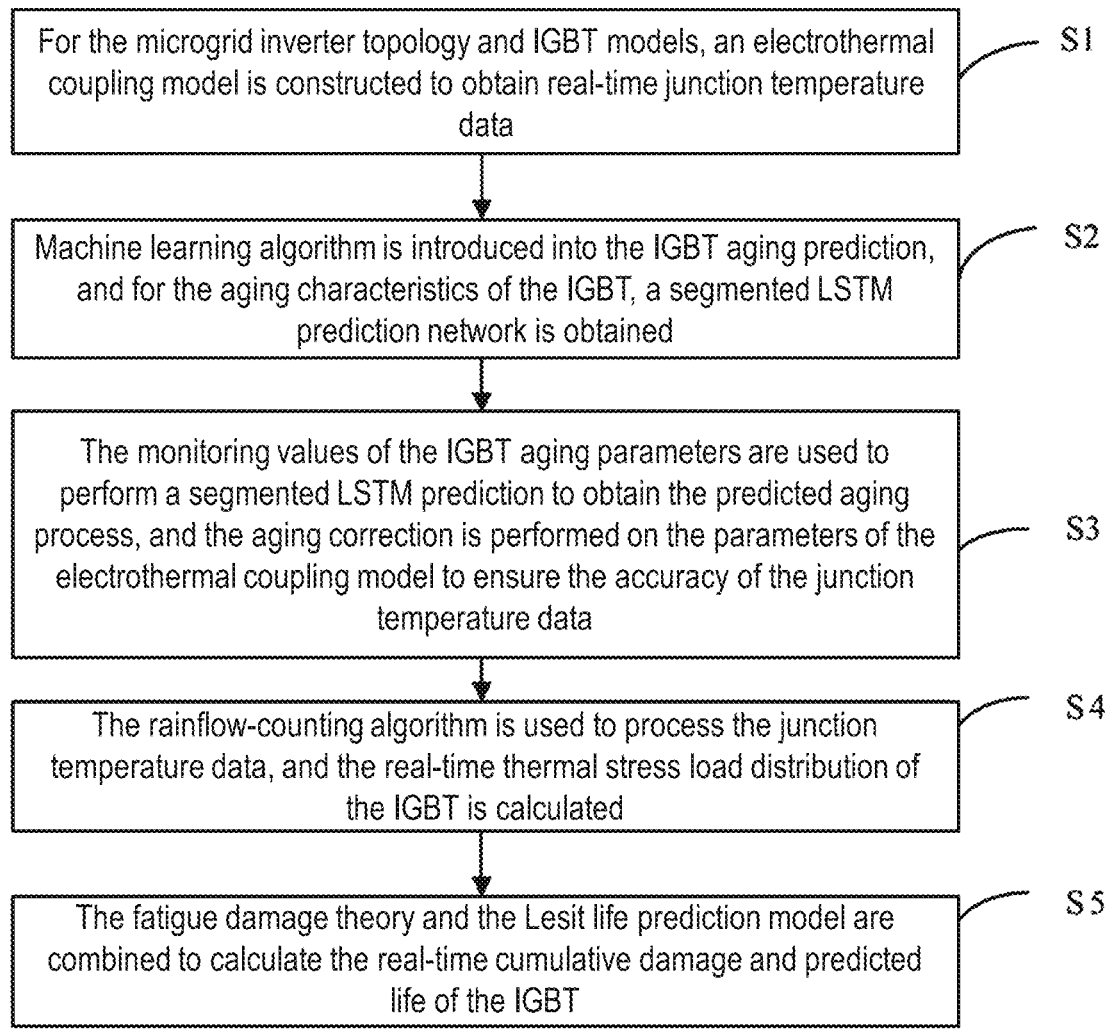
FIG. 1 is a flowchart illustrating a fusion reliability evaluation method for a microgrid inverter IGBT based on segmented long short-term memory (LSTM) according to an embodiment of the disclosure.
Figure 2:
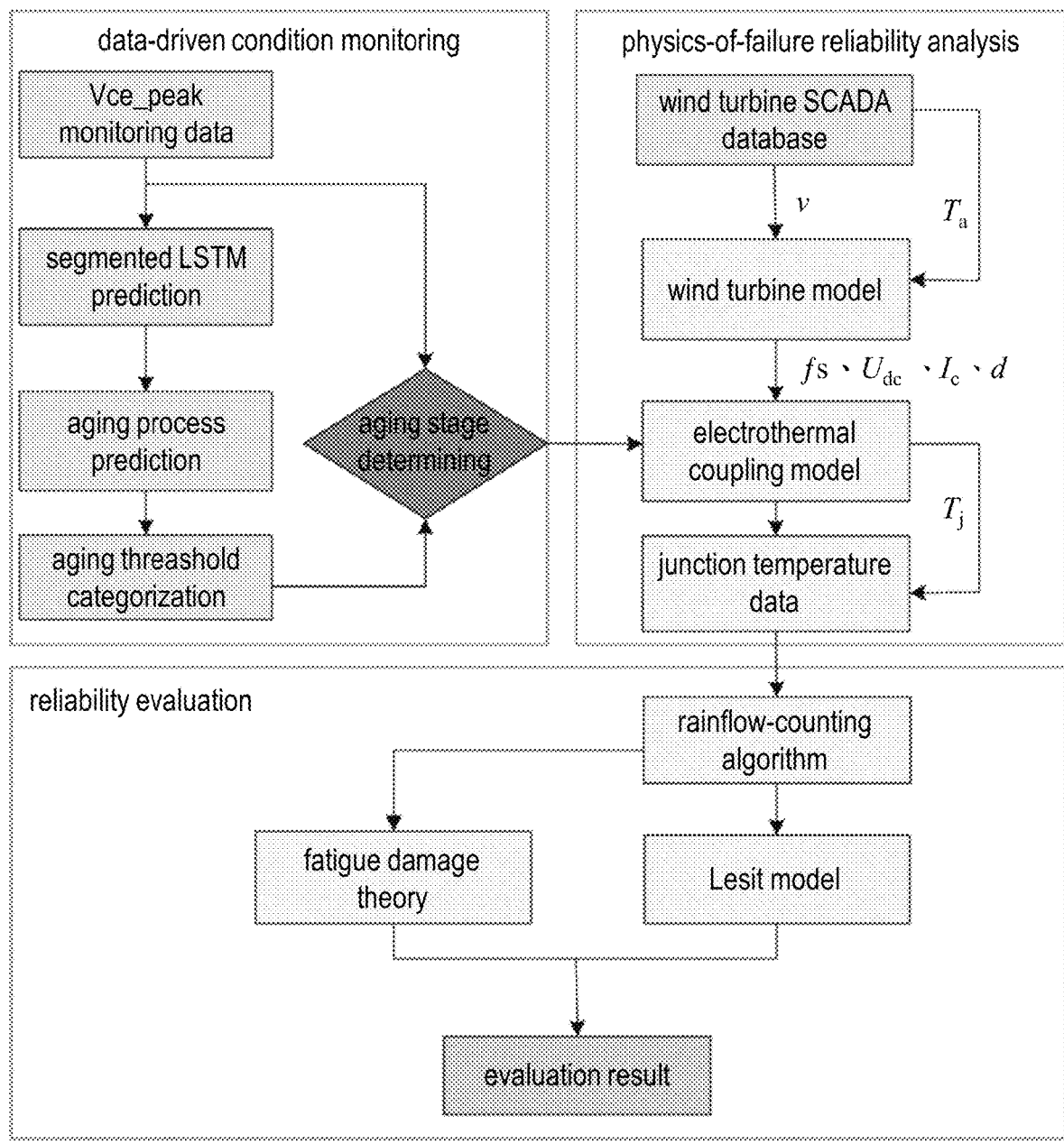
FIG. 2 is a flowchart illustrating a fusion reliability evaluation method for a 20 kW doubly-fed wind power generation system in a microgrid according to an embodiment of the disclosure.

Referring to FIG. 1 and FIG. 2, the embodiment of the disclosure includes steps as follows:

S1: Based on the microgrid inverter topology and specific IGBT type (model number), an electrothermal coupling model is constructed to obtain real-time junction temperature data.

Figure 3:
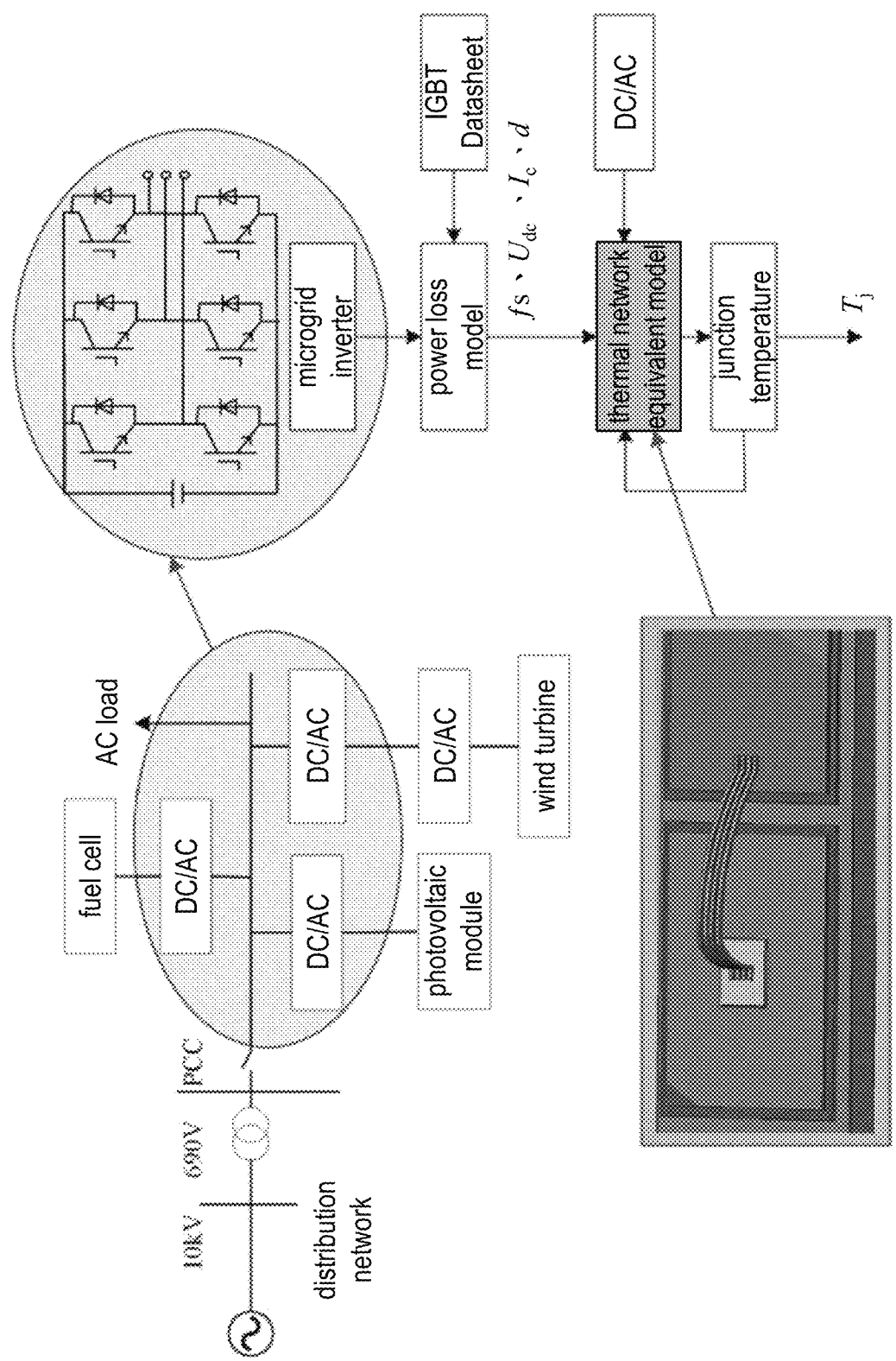
FIG. 3 is a flowchart of constructing an electrothermal coupling model according to an embodiment of the disclosure.
Figure 4:
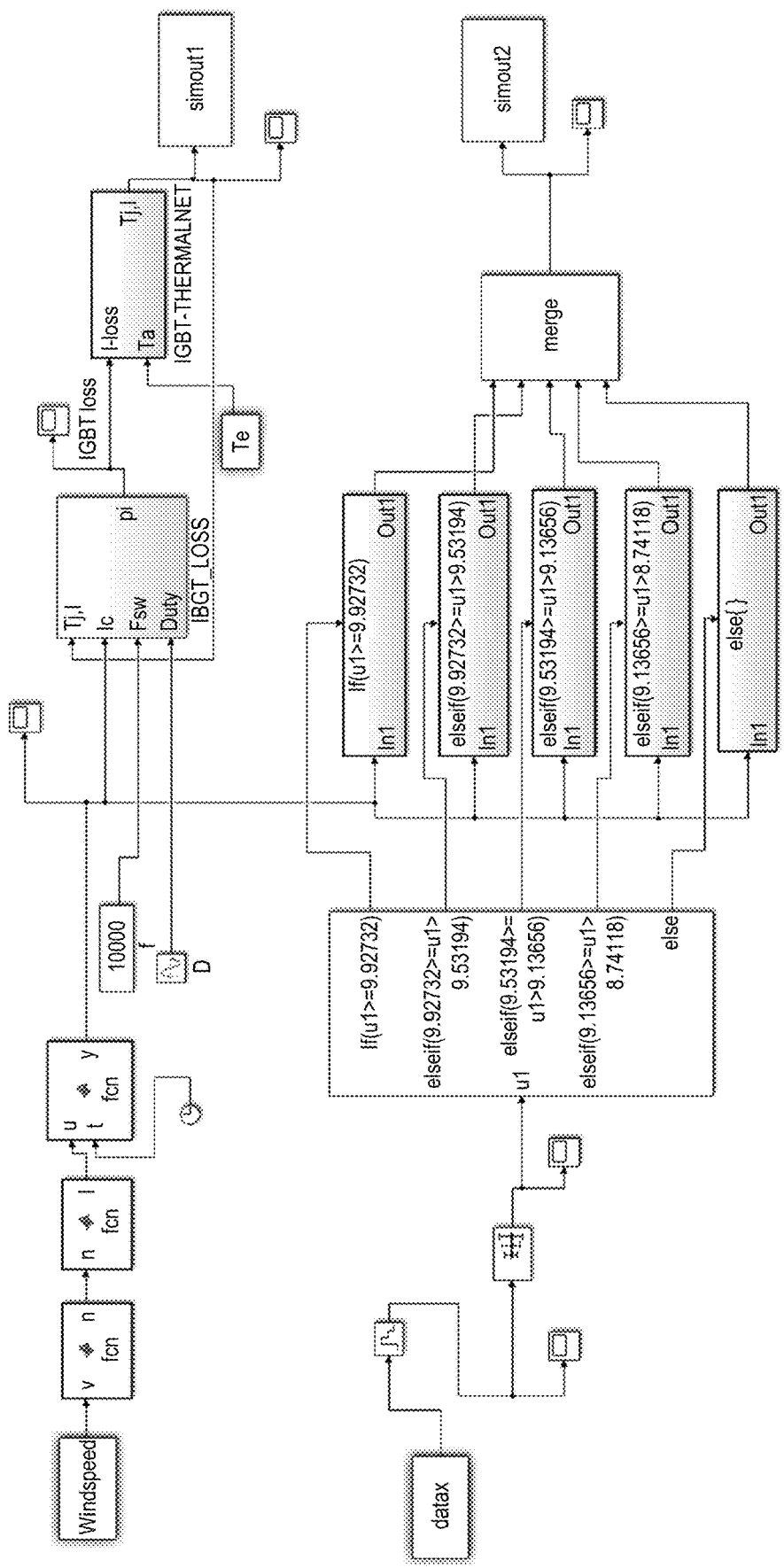
FIG. 4 illustrates an IGBT module electrothermal coupling simulation model according to an embodiment of the disclosure.

Referring to FIG. 3, for the microgrid inverter topology, combined with IGBT operating characteristics (switching frequency fs, DC side voltage $U_{dc}$, conduction current $I_c$, and duty cycle d), the IGBT power loss model is derived. The thermal network equivalent model of the IGBT is derived based on the physical structure of the IGBT module and the internal heat conduction process. Second, an electrothermal coupling simulation model is constructed in MATLAB/Simulink from the power loss model and the thermal network equivalent model, as shown in FIG. 4. FIG. 4 is used to illustrate a schematic diagram of constructing an electrothermal coupling simulation model. As for the numbers and device names in the drawing, they do not affect the understanding of the disclosure and do not form a unique limitation to the embodiments of the disclosure. The output power loss value of the power loss model is input into the thermal network equivalent model of the IGBT module to simulate the junction temperature calculation, and finally the real-time junction temperature fluctuation data of the IGBT module under the current operating conditions can be output.

S2: Machine learning algorithm is introduced into the IGBT aging prediction, and the original LSTM algorithm is improved for the aging characteristics of the IGBT to obtain a segmented LSTM prediction network.

In the embodiment of the disclosure, the segmented LSTM prediction network is used to determine the aging process of the IGBT to modify the parameters of the electrothermal coupling model so as to obtain accurate junction temperature data.

Figure 5:
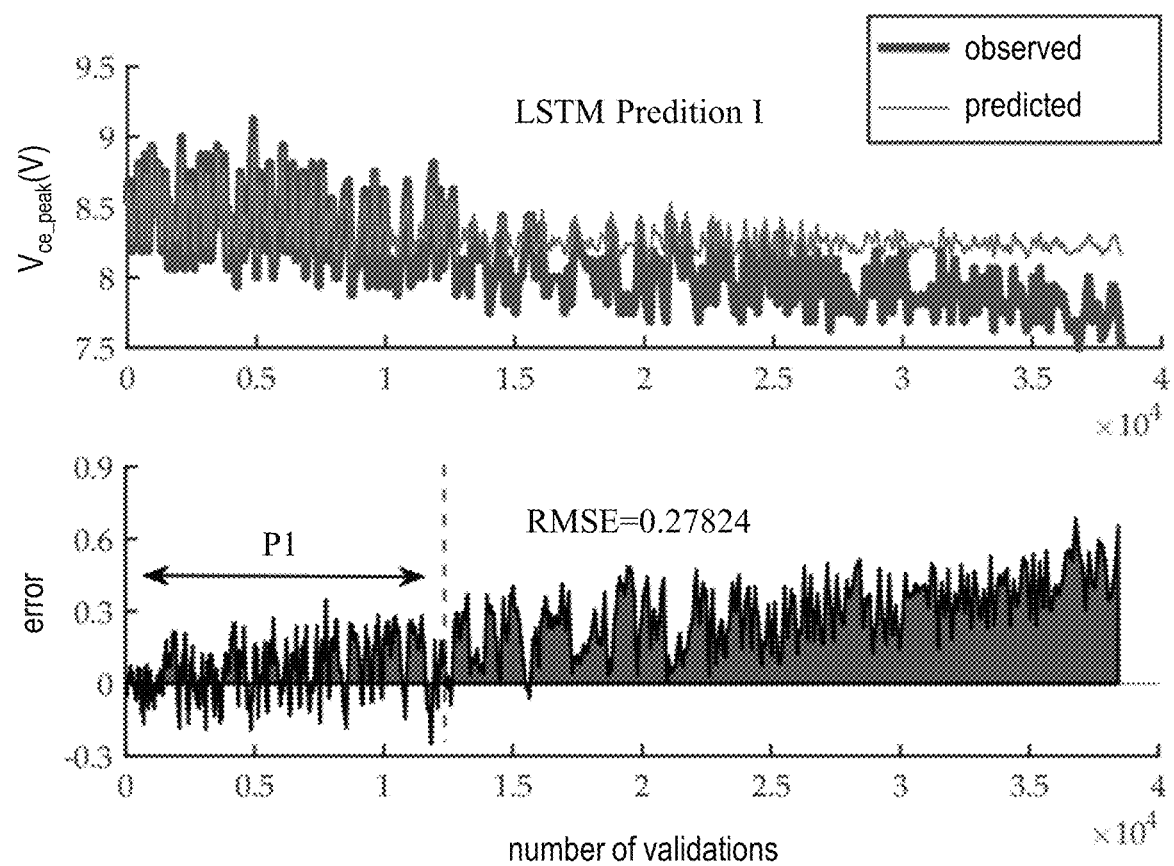
FIG. 5 illustrates an LSTM prediction result according to an embodiment of the disclosure.
Figure 6:
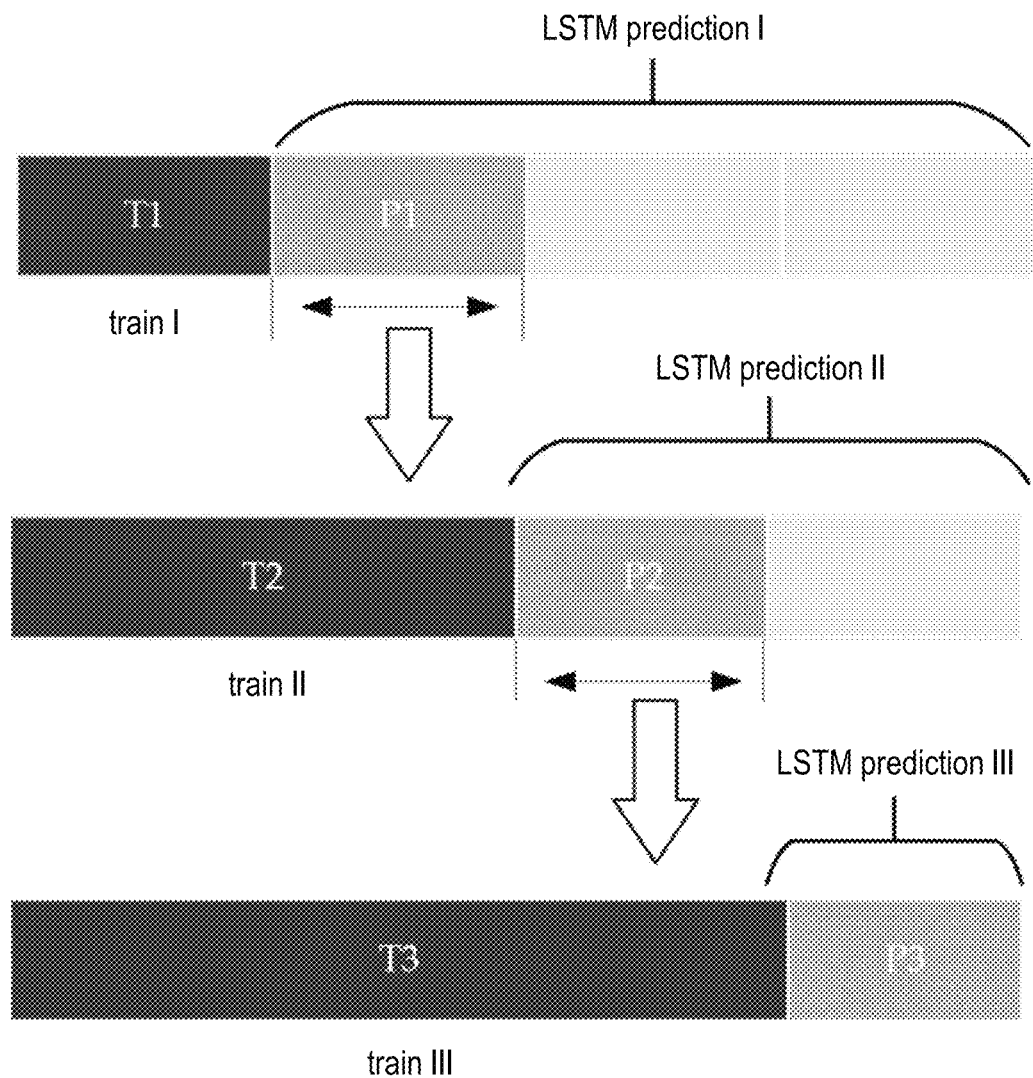
FIG. 6 is a flowchart illustrating a segmented LSTM algorithm according to an embodiment of the disclosure.

In actual engineering, it is impossible to obtain a large amount of aging parameter data in a short period of time. Only continuous monitoring of aging parameters for data accumulation is not good for real-time determining the aging state of IGBT. The IGBT collector-emitter turn-off impulse voltage $V_{ce\_peak}$ is used as the aging parameter to predict the segmented LSTM, and the LSTM algorithm is used to predict the aging process of the IGBT based on the observed aging data. The top 25% aging data of the data is set as training data to train the LSTM time series prediction network, accordingly the subsequent 75% aging process is predicted, and the result is shown in FIG. 5. It can be found that the prediction data in the early stage of the prediction is basically consistent with the actual situation, and the error is minor, but in the later stage of the prediction, the prediction data is quite inconsistent with the actual situation, and the RMSE value is 0.2782. In this regard, a segmented LSTM prediction method is proposed, and the flow of the method is shown in FIG. 6.

1) When performing the first LSTM prediction, the top ⅓ data (P1) of the predicted aging data is retained, and the top ⅓ data (P1) together with the original training data (T1) constitute the training data set (T2) for the second LSTM prediction.

2) When performing the second LSTM prediction, the top ½ data (P2) of the prediction data is retained, and the top ½ data (P2) together with T2 constitute the training data set (T3) of the third LSTM prediction.

3) In the third LSTM prediction, all the aging prediction data (P3) is retained.

Figure 7:
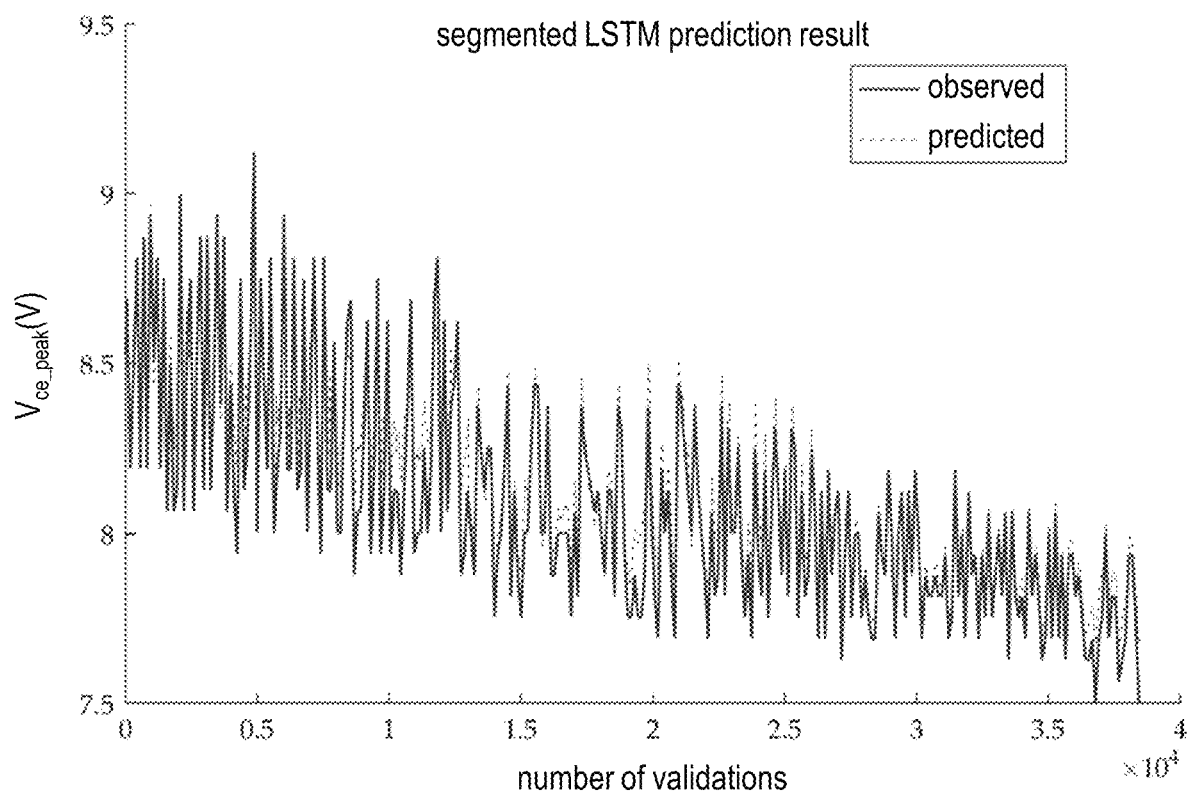
FIG. 7 illustrates a segmented LSTM prediction result according to an embodiment of the disclosure.

After three segmented LSTM predictions, finally, the prediction data and the monitoring data are compared as shown in FIG. 7, and the RMSE value is only 0.1153. In comparison to the original LSTM prediction results, the segmented LSTM algorithm has a higher prediction accuracy with the limited training data and better fulfills the needs of the microgrid inverter IGBT aging state evaluation and the reliability analysis.

S3: The monitoring values of the IGBT aging parameters are used to perform segmented LSTM prediction to obtain the predicted aging process, the thresholds of different aging stages are categorized to compare the thresholds with the monitoring values, the aging stage of the IGBT is determined in real time, and the aging correction is performed on the parameters of the electrothermal coupling model to ensure the accuracy of the junction temperature data.

Figure 8:
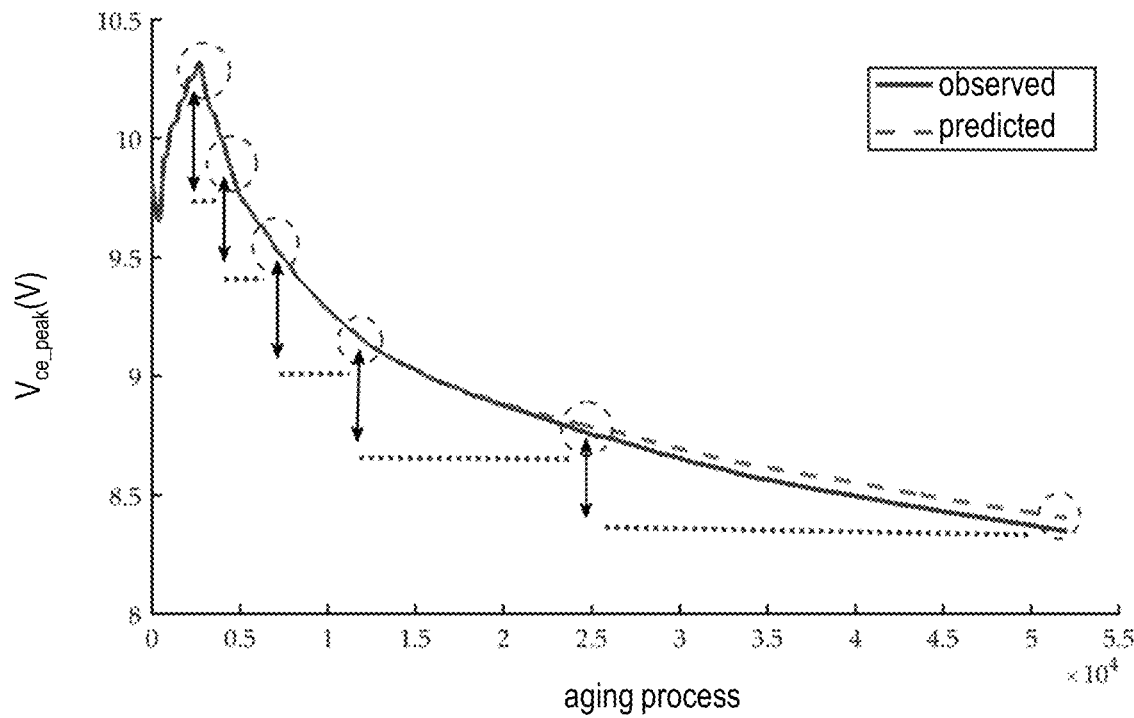
FIG. 8 is an aging process of an IGBT according to an embodiment of the disclosure.

In the embodiment of the disclosure, the parameters of the electrothermal coupling model can be corrected in the following ways:

1) The monitoring values of IGBT aging parameters is used to perform the segmented LSTM prediction to obtain the predicted aging process, as shown in FIG. 8.

2) The thresholds of different aging stages are categorized according to the aging process curve, as shown in Table 2.

3) The threshold values are compared with the monitoring data. The aging stage of the IGBT can be determined in real time, and then the corresponding aging correction coefficient r can be selected.

4) The aging correction coefficient r is substituted into the thermal resistance update formula to update the thermal network parameters of the electrothermal coupling model to ensure the accuracy of the junction temperature data. The thermal resistance update formula is as follows:

$$R = R_{initial}(1 + a \cdot r^m)$$

In the formula, $R_{initial}$ is the thermal network parameter of the electrothermal coupling model, a is the aging factor (the standard value is 0.5), r is the aging correction coefficient, and m is the thermal stress factor (the standard value is 1).

TABLE 2

IGBT Aging Threshold

| aging threshold | predicted/V | actual measurement/V | aging correction factor |
|---|---|---|---|
| completely healthy | 10.323 | 10.323 | — |
| aging stage 1 | 9.939 | 9.927 | 0.2 |
| aging stage 2 | 9.554 | 9.532 | 0.4 |
| aging stage 3 | 9.170 | 9.134 | 0.6 |
| aging stage 4 | 8.786 | 8.741 | 0.8 |
| aging stage 5 | 8.402 | 8.346 | 1.0 |

Figure 9:
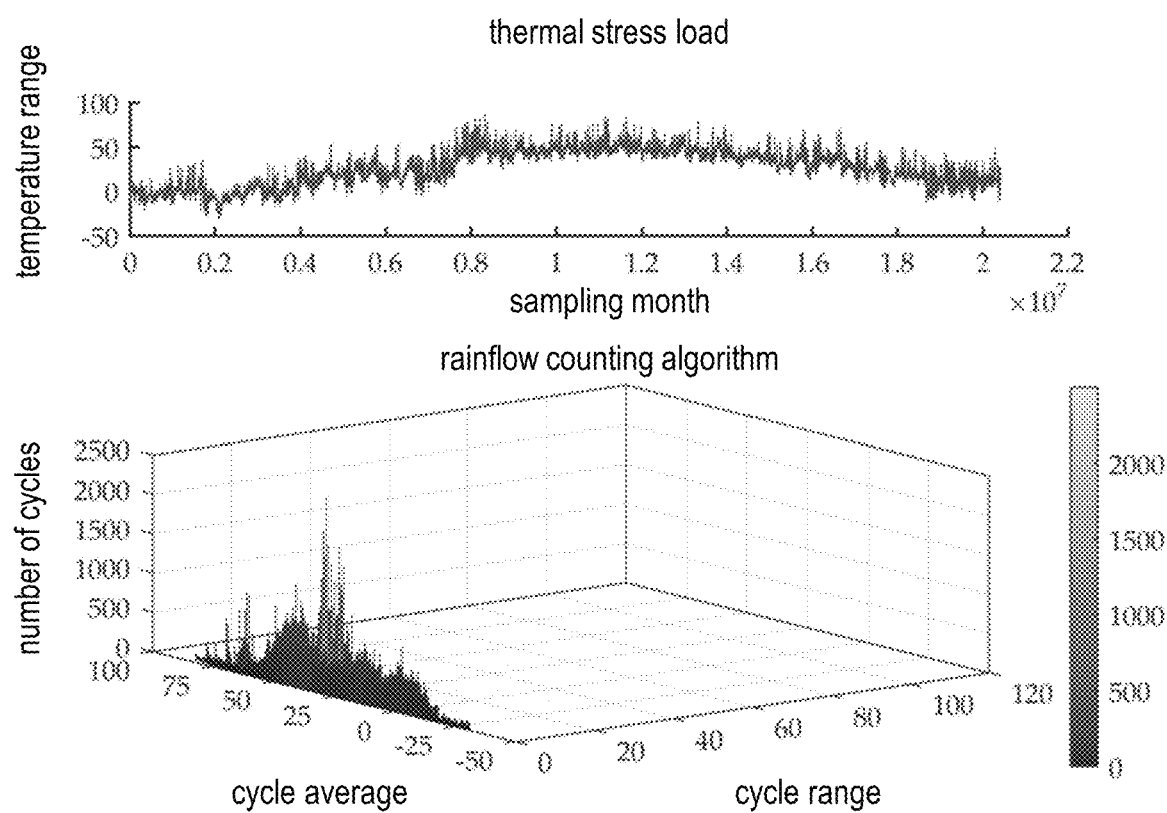
FIG. 9 is an output result of a rainflow-counting algorithm according to an embodiment of the disclosure.

S4: The rainflow-counting algorithm is used to process the corrected junction temperature data, and the real-time thermal stress load distribution of the IGBT is calculated, as shown in FIG. 9. The corrected junction temperature data refers to the junction temperature data output by the electrothermal coupling model corrected based on the segmented prediction results.

S5: The fatigue damage theory and the Lesit life prediction model are combined to calculate the real-time cumulative damage and predicted life of the IGBT.

Taking the cumulative damage and service life statistics of the IGBT modules of the same type of wind power converters as the mathematical expectation of reliability evaluation, Table 3 illustrates the comparison results of using different algorithms for aging correction. Without aging correction, the errors of the cumulative damage and predicted life reach 45.51% and 83.52% respectively, which shows that the IGBT health status is far overestimated. After performing the aging correction based on the actual aging parameter observation data, the errors of the cumulative damage and the predicted life are only 3.88% and 4.03%. It can be found that by monitoring the aging state and updating the parameters of the electrothermal coupling model in time, the accuracy of reliability analysis can be greatly improved.

With limited aging observation data, the segmented LSTM algorithm, the LSTM algorithm, and the traditional time series prediction ARIMA algorithm are used to predict the aging data. Compared with the LSTM algorithm and the ARIMA algorithm, the segmented LSTM algorithm can predict the health of the IGBT more accurately. Accordingly, the errors of the corrected cumulative damage and predicted life are only 5.1% and 5.83%, respectively.

TABLE 3

Comparison of Output Results of Different Correction Algorithms

| algorithm type | cumulative damage | life prediction/year |
|---|---|---|
| without corrections | 0.0267 (45.51%) | 37.453 (83.52%) |

TABLE 3-continued

Comparison of Output Results of Different Correction Algorithms

| algorithm type | cumulative damage | life prediction/year |
|---|---|---|
| correction of prediction data based on segmented LSTM | 0.0465 (5.10%) | 21.598 (5.83%) |
| correction of prediction data based on LSTM | 0.0398 (18.78%) | 25.126 (23.19%) |
| correction of prediction data based on ARIMA | 0.0341 (30.41%) | 29.323 (43.68%) |
| correction of prediction data based on actual observation | 0.0471 (3.88%) | 21.231 (4.03%) |
| mathematical expectation | 0.049 | 20.408 |

In another embodiment of the application, a fusion reliability evaluation system for a microgrid inverter IGBT based on segmented long short-term memory (LSTM) is provided and the system includes:

a model constructing unit used for constructing an electrothermal coupling model for the microgrid inverter topology and IGBT type;

a prediction network constructing unit used to introduce a machine learning algorithm into IGBT aging prediction and obtain a segmented LSTM prediction network for the aging characteristics of the IGBT;

a prediction correction unit used to perform segmented LSTM prediction by using the monitoring values of the IGBT aging parameters, obtain the predicted aging process, and perform an aging correction on the parameters of the electrothermal coupling model to ensure the accuracy of the junction temperature data, in which the aging parameters include the IGBT collector-emitter turn-off impulse voltage;

a junction temperature data processing unit used to process the junction temperature data output by the electrothermal coupling model corrected based on the segmented LSTM prediction result by using the rainflow-counting algorithm and calculate the real-time thermal stress load distribution of the IGBT; and a reliability evaluation unit used to combine the fatigue damage theory and the Lesit life prediction model to calculate the real-time cumulative damage and predicted life of the IGBT.

In some alternative implementations, the training method of the segmented LSTM prediction network is as follows.

When performing the first LSTM prediction, the top several parts of the predicted aging data are retained, and the top several parts together with the initial aging training data constitute the training data set for the second LSTM prediction.

When performing the second LSTM prediction, the top several parts of the predicted aging data are retained, and the top several parts together with the previous aging training data constitute the training data set for the third LSTM prediction.

In the third LSTM prediction, all predicted aging data are retained.

In some alternative implementations, the prediction correction unit is used to perform segmented LSTM prediction by using the monitoring value of the IGBT aging parameter to obtain the predicted aging process; the thresholds of different aging stages are categorized according to the aging process curve; the threshold value is compared with the monitored aging data to determine the aging stage of the IGBT in real time, and then the corresponding aging correction coefficient is selected; the thermal network parameters of the electrothermal coupling model are updated by the aging correction coefficient to ensure the accuracy of the junction temperature data.

In some alternative implementations, the thermal network parameters of the electrothermal coupling model are updated. $R_{initial}$ is the thermal network parameter of the electrothermal coupling model, a is the aging factor, r is the aging correction coefficient, m is the thermal stress factor, and R is the thermal resistance value.

In the embodiment of the disclosure, for the specific implementation of each unit, refer to the description of the foregoing method embodiment, which is not iterated in the description of the embodiment of the disclosure.

The application further provides a computer-readable storage medium, such as flash memory, hard disks, multimedia cards, card-type memory (e.g., SD or DX memory, and the like.), random access memory (RAM), static random access memory (SRAM), read only memory (ROM), electrically erasable programmable read only memory (EEPROM), programmable read-only memory (PROM), magnetic storage, magnetic disks, optical disks, servers, App application malls, and the like. A computer program is stored thereon, and when the program is executed by the processor, the fusion reliability evaluation method for a microgrid inverter IGBT based on segmented long short-term memory (LSTM) in the method embodiment is implemented.

It should be pointed out that according to the needs of implementation, each step/component described in this application can be split into more steps/components, or two or more steps/components or partial operations of steps/components can be combined into new steps/components to achieve the purpose of the disclosure.

Those skilled in the art can easily tell that the above are only preferred embodiments of the disclosure and are not intended to limit the disclosure. Any modification, equivalent replacement and improvement, and the like made within the spirit and principle of the disclosure shall be included in the protection scope of the disclosure.

What is claimed is:

1. A reliability evaluation method for an insulated gate bipolar transistors (IGBT) of a microgrid inverter of a microgrid based on segmented long short-term memory (LSTM), comprising following steps executing by a processor:
   step 1 of performing an operation of the microgrid and constructing an electrothermal coupling model for a microgrid inverter topology and an IGBT type;
   step 2 of introducing a machine learning algorithm into an IGBT aging prediction and obtaining a segmented LSTM prediction network for aging characteristics of the IGBT;
   step 3 of using a monitoring value of an IGBT aging parameter to perform a segmented LSTM prediction, obtaining a predicted aging process, and performing an aging correction on parameters of the electrothermal coupling model to ensure accuracy of junction temperature data, wherein, the IGBT aging parameter comprises an IGBT collector-emitter turn-off impulse voltage;
   step 4 of using a rainflow-counting algorithm to process junction temperature data output by the electrothermal coupling model corrected based on a segmented LSTM prediction result and calculating real-time thermal stress load distribution of the IGBT;
   step 5 of combining a fatigue damage theory and a Lesit life prediction model and calculating real-time cumulative damage and predicted life of the IGBT;
   step 6: employing a physical IGBT power module in a power system of the microgrid; and
   step 7: modifying the operation of the microgrid and a modifying a performance of the physical IGBT power module based on the real-time cumulative damage and predicted life of the IGBT.

2. The reliability evaluation method according to claim 1, wherein a training method of the segmented LSTM prediction network comprises:
   retaining top several part data of the predicted aging data when performing a first LSTM prediction, wherein the top several part data together with the initial aging training data constitute a training data set for a second LSTM prediction;
   retaining the top several part data of the predicted aging data when performing the second LSTM prediction, wherein the top several part data together with previous aging training data constitute a training data set for a third LSTM prediction; and
   retaining all predicted aging data in the third LSTM prediction.

3. The reliability evaluation method according to claim 1, wherein the step 3 comprises:
   step 3.1 of using the monitoring value of the IGBT aging parameter to perform the segmented LSTM prediction to obtain the predicted aging process;
   step 3.2 of categorizing threshold values of different aging stages according to an aging process curve;
   step 3.3 of comparing a threshold value with monitored aging data, determining an aging stage of the IGBT in real time, and then selecting a corresponding aging correction coefficient; and
   step 3.4 of updating a thermal network parameter of the electrothermal coupling model by the aging correction coefficient to ensure the accuracy of the junction temperature data.

4. The reliability evaluation method according to claim 3, wherein the step 3.4 comprises:
   updating the thermal network parameter of the electrothermal coupling model with $R=R_{initial}(1+a \cdot r^m)$, wherein Rinital is the thermal network parameter of the electrothermal coupling model, a is an aging factor, r is the aging correction coefficient, m is a thermal stress factor, and R is a thermal resistance value.

5. A computer-readable storage medium comprising a computer program stored thereon, wherein the computer program implements steps of claim 1 when the computer program is executed by a processor.

6. The reliability evaluation method according to claim 2, wherein the step 3 comprises:
   step 3.1 of using the monitoring value of the IGBT aging parameter to perform the segmented LSTM prediction to obtain the predicted aging process;
   step 3.2 of categorizing threshold values of different aging stages according to an aging process curve;
   step 3.3 of comparing a threshold value with monitored aging data, determining an aging stage of the IGBT in real time, and then selecting a corresponding aging correction coefficient; and
   step 3.4 of updating a thermal network parameter of the electrothermal coupling model by the aging correction coefficient to ensure the accuracy of the junction temperature data.

7. A computer-readable storage medium comprising a computer program stored thereon, wherein the computer program implements steps of claim 2 when the computer program is executed by a processor.

8. A computer-readable storage medium comprising a computer program stored thereon, wherein the computer program implements steps of claim 3 when the computer program is executed by a processor.

9. A computer-readable storage medium comprising a computer program stored thereon, wherein the computer program implements steps of claim 4 when the computer program is executed by a processor.

\* \* \* \* \*